March 1, 1932.  J. P. TARBOX  1,847,279

REENFORCED SHEET METAL WHEEL

Filed Oct. 25, 1929

INVENTOR.
John P. Tarbox

Patented Mar. 1, 1932

1,847,279

UNITED STATES PATENT OFFICE

JOHN P. TARBOX, OF PHILADELPHIA, PENNSYLVANIA, ASSIGNOR TO BUDD WHEEL COMPANY, OF PHILADELPHIA, PENNSYLVANIA, A CORPORATION OF PENNSYLVANIA

REENFORCED SHEET METAL WHEEL

Application filed October 25, 1929. Serial No. 402,328.

The principal aim of my invention is the elimination of a multi-piece construction commonly found in wheels, the naves of which are comprised of axially spaced sheet metal side walls. Such side walls are of themselves relatively weak and subject to collapse under strain of axial securing means, such as a series of securing bolts. It has been the common practice to use sometimes complex and often many-pieced wall spacing and interbracing structures. These structures are sometimes composed of several pieces in the region of each bolt hole of an annular series.

Another object is a simplification of the securing of the parts of the nave and the interbracing means together in structures of the nature just described. A number of different operations are often required in one or more different machines. I aim to utilize but one operation, to wit, that by means of which the nave of the wheel itself is secured together.

These aims and others are attained by constructing the nave of axially spaced sheet metal side walls flash welded together in spaced relation, constructing the spacing and interbracing devices as unitary stampings or forgings, and assembling it with the walls of the nave in spacing and interbracing relation in the process and by the means employed in constructing the nave itself, that is to say, in the flash welding process by means of the flash weld itself.

Other objects and the attainment of all the objects will be fully apparent upon a review of the drawings presented herewith.

Of these drawings.

Figure 1:
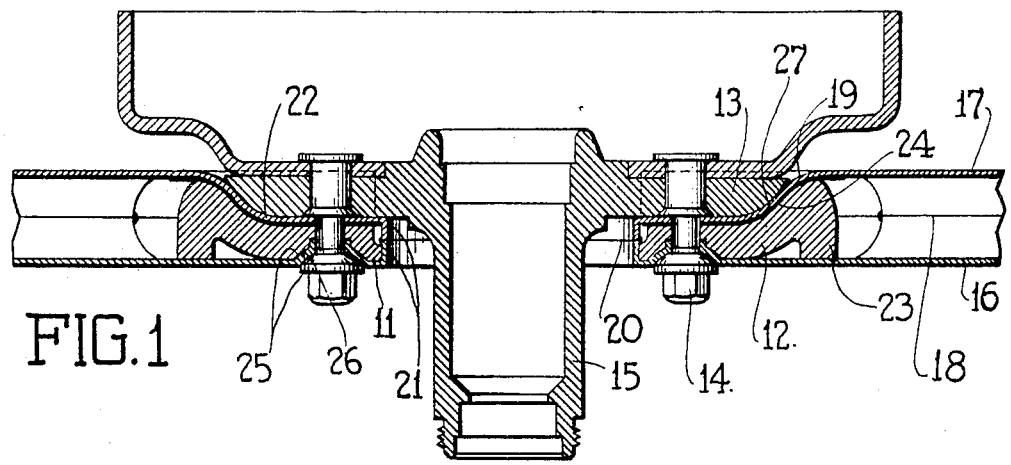
Fig. 1 is an axial cross section of a wheel of my invention as mounted on the hub.
Figure 2:
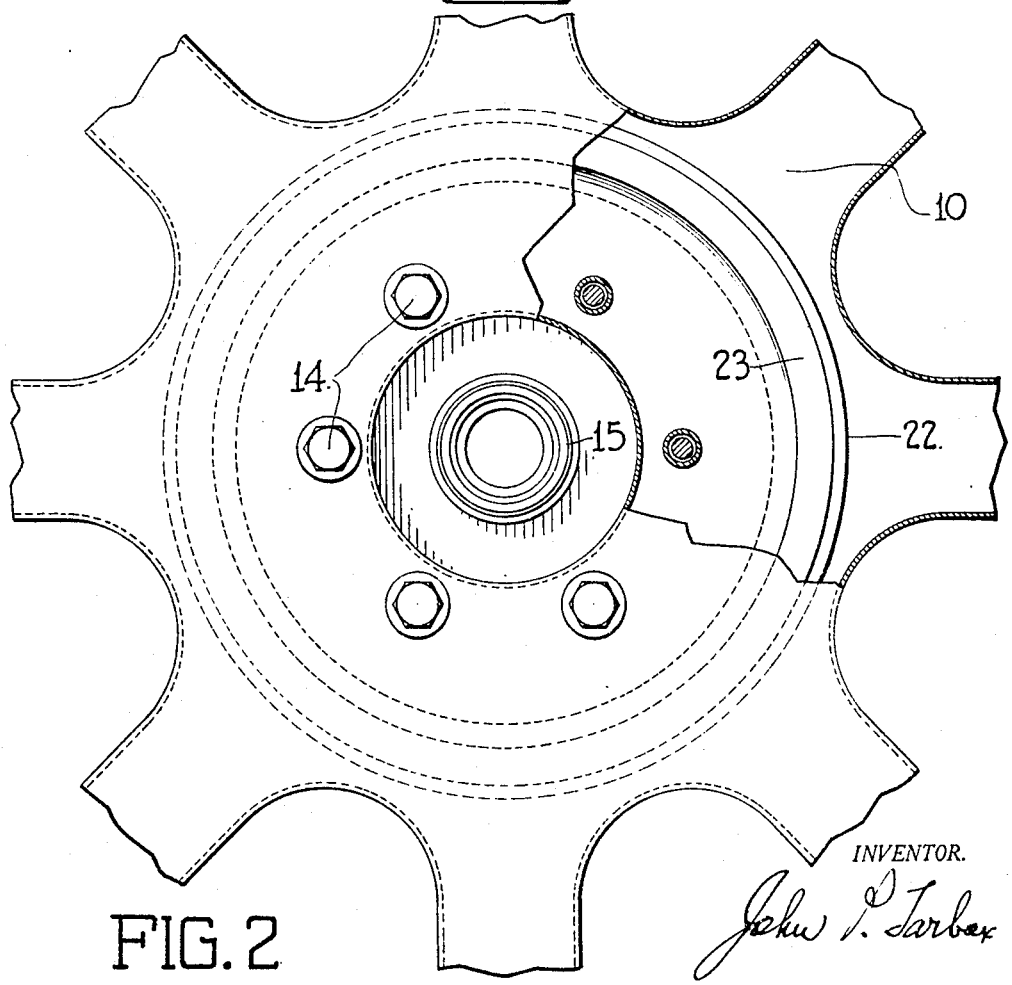
Fig. 2 is an end elevation of certain parts broken away to show the interior of the nave.

In both figures only the spokes are shown, those portions of the wheel remote from the nave being omitted.

The body of the wheel is designated 10, the nave portion 11, the reenforcing and interbracing annulus 12, and the hub flange on which it is mounted, 13, the studs and nuts by means of which it is secured, 14, and the axial main hub barrel which carries the flange 13 is designated 15.

The body 10 of the wheel is comprised of two unitary stampings 16 and 17 lying respectively on opposite sides of the medial spoke plane 18 approximately in the plane of tread. These halves also integrally comprehend the nave 11, but the inner stamping 17 is provided with an outward offset 19 in the region of the periphery of the hub flange 13, whereby the sheet metal side walls of the nave 11 are spaced apart a less distance inwardly of the region of the spokes and immediately joining the region of the spokes, whereby the plane of joinder of the inner and outer sheet metal side walls 16 and 17 at the inner periphery of the nave is placed outwardly of the medial plane of joinder of the remainder of the wheel, as indicated at 20. The oppositely turned flanges 21 of the inner periphery meet in this plane. Flash welding is simultaneously done along all lines of meeting, irrespective of the planes in which they lie.

The annular spacing and interbracing member 12 is comprised of a unitary stamping or forging in the form of an annulus having a flanged periphery. The main body fills the space between side walls 16 and 17 in the inner zone of the nave, the flanged periphery 23 spaces apart and interbraces sheet metal side walls 16 and 17 in the region of the spokes. Flanged periphery 23 is, as shown, reversely bent first inwardly, then outwardly, thereby providing first, a portion 24 complemental to the offset 19 and bracing and reenforcing that offset, and second, an edge portion 24 spacing and bracing the outer side wall 16.

The annular series of bolt holes passes commonly through side walls 16 and 17 of the nave and the main body of reenforcing annulus 11. The annulus and the outer side wall 16 of the nave are provided with complemental and nested seating portions 25 for the faces 26 of the securing nuts. These seats, as shown, are in the form of spherical depressions.

The offset 19 is curvilinear in form. The periphery of the hub flange 13 is complementally formed, whereby when the nave is mounted thereon by the studs and nuts 14, the inner sheet metal side wall 17 is clamped between and mutually reenforced by the complemental portion 24 of the annulus 11 and the periphery 27 of the hub flange.

The process of constructing my wheel comprises with others, the following steps. First, the separate fabrication of the inner and outer side walls 16 and 17 and the annulus 12, each as a unitary stamping, complete with all offsets, flanges, seats, etc. Then these parts are super-imposed in a flash welding machine, the stamping of side wall 16 first, the annulus 12 next, and the other side wall, as 17, last. Suitable insulation 22 is interposed between the annulus 12 and one of the side walls to prevent short circuiting of current by the annulus, which insulation in itself, is in the form of a ring of sheet material. Thereupon the side walls 16 and 17 are flash welded together in the planes 18 and 20. In flash welding the welding current is cut off at such point that the final push-up after the current is cut off brings the side walls 16 and 17 into close contiguity with the faces of the annulus 12 and retains them there, whereby upon cooling of the weld, the annulus 12 is firmly embraced by the side walls and in turn spaces and interbraces them.

Such is the structure which attains for me the objects of my invention. That it does attain them is self apparent, but besides attaining an utmost simplicity of structure and an utmost simplicity of assembly, there is attained at the same time great strength and durability, and an adaptability of the artillery spoked sheet metal wheel for securement on the same studs and nuts by means of which disc and wire wheels are secured. In this wheel by virtue of reduced spacing between side walls 16 and 17 the innermost portions of the nave are of a thinness entirely comparable with the relatively thin securing portions of demountable disc and wire wheels.

Those modifications of which my invention may be found susceptible, I seek likewise to protect in the annexed claims.

What I claim is:—

1. A vehicle wheel including a nave having spaced apart sheet metal side walls, the inner side wall of which is offset to form a reduced portion adjacent the inner periphery of the wheel, and a reenforcing annulus enclosed within said side walls, said reenforcing annulus being offset complementally to the offset portion of the inner side wall and being provided with an annular flange on its outer periphery adapted to abut the opposite side wall beyond the offset portion.

2. A vehicle wheel including a nave having spaced apart sheet metal side walls, the inner side wall of which is offset to form a reduced portion adjacent the inner periphery of the wheel, and a reenforcing annulus enclosed within said side walls, said reenforcing annulus being offset complementally to the offset portion of the inner side wall and being provided with an annular flange on its outer periphery adapted to abut the opposite side wall beyond the offset portion, said offset portion of the inner side wall being adapted to abut a complementally curved hub flange to effect a seat for said wheel body.

In testimony whereof I hereunto affix my signature.

JOHN P. TARBOX.